United States Patent
Trainin

(10) Patent No.: US 7,801,168 B2
(45) Date of Patent: Sep. 21, 2010

(54) SYSTEMS AND METHODS FOR MULTI-SLOTTED POWER SAVING MULTIPLE POLLING IN WIRELESS COMMUNICATIONS

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 11/472,029

(22) Filed: Jun. 21, 2006

(65) Prior Publication Data

US 2007/0297351 A1    Dec. 27, 2007

(51) Int. Cl.
*H04B 7/216* (2006.01)
(52) U.S. Cl. .................... 370/447; 370/461
(58) Field of Classification Search ........... 370/236, 370/328, 329, 447, 461, 506
See application file for complete search history.

(56) References Cited

U.S. PATENT DOCUMENTS

2006/0050742 A1* 3/2006 Grandhi et al. ............ 370/506
2007/0097867 A1* 5/2007 Kneckt et al. ............. 370/236
2007/0171858 A1* 7/2007 Grandhi et al. ............ 370/328

* cited by examiner

*Primary Examiner*—Kevin C Harper
*Assistant Examiner*—Wanda Z Russell
(74) *Attorney, Agent, or Firm*—Schubert Law Group, PLLC; Neil Cohen

(57) ABSTRACT

Embodiments include systems and methods for scheduling transmissions of information in a wireless network. Embodiments comprise determining a service interval that is a multiple of a service interval granularity period, the multiple depending upon a type of information to be transmitted during the service interval.

23 Claims, 4 Drawing Sheets

SYSTEMS AND METHODS FOR MULTI-SLOTTED POWER SAVING MULTIPLE POLLING IN WIRELESS COMMUNICATIONS

FIELD

Embodiments are in the field of wireless communications. More particularly, embodiments are in the field of scheduling communications between wireless transceivers.

BACKGROUND

A wireless communication device may comprise at least one transmitter to transmit information over an RF (Radio Frequency) channel and may also comprise at least one receiver to receive information from the RF channel. A wireless communication system may comprise two or more communication devices spaced apart, each device having a transceiver comprising a transmitter and a receiver. Typically, at least one device transceiver is able to transmit to and receive from the transceivers of multiple other devices. Some wireless communications systems utilize Digital Beam Forming techniques to steer information into separate spatial channels.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are introduced in such detail as to clearly communicate the invention. However, the embodiment(s) presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

Embodiments include systems and methods for scheduling transmissions of information in a wireless network. Embodiments comprise determining a service interval that is a multiple of a service interval granularity period, the multiple depending upon a type of information to be transmitted during the service interval.

Figure 1:
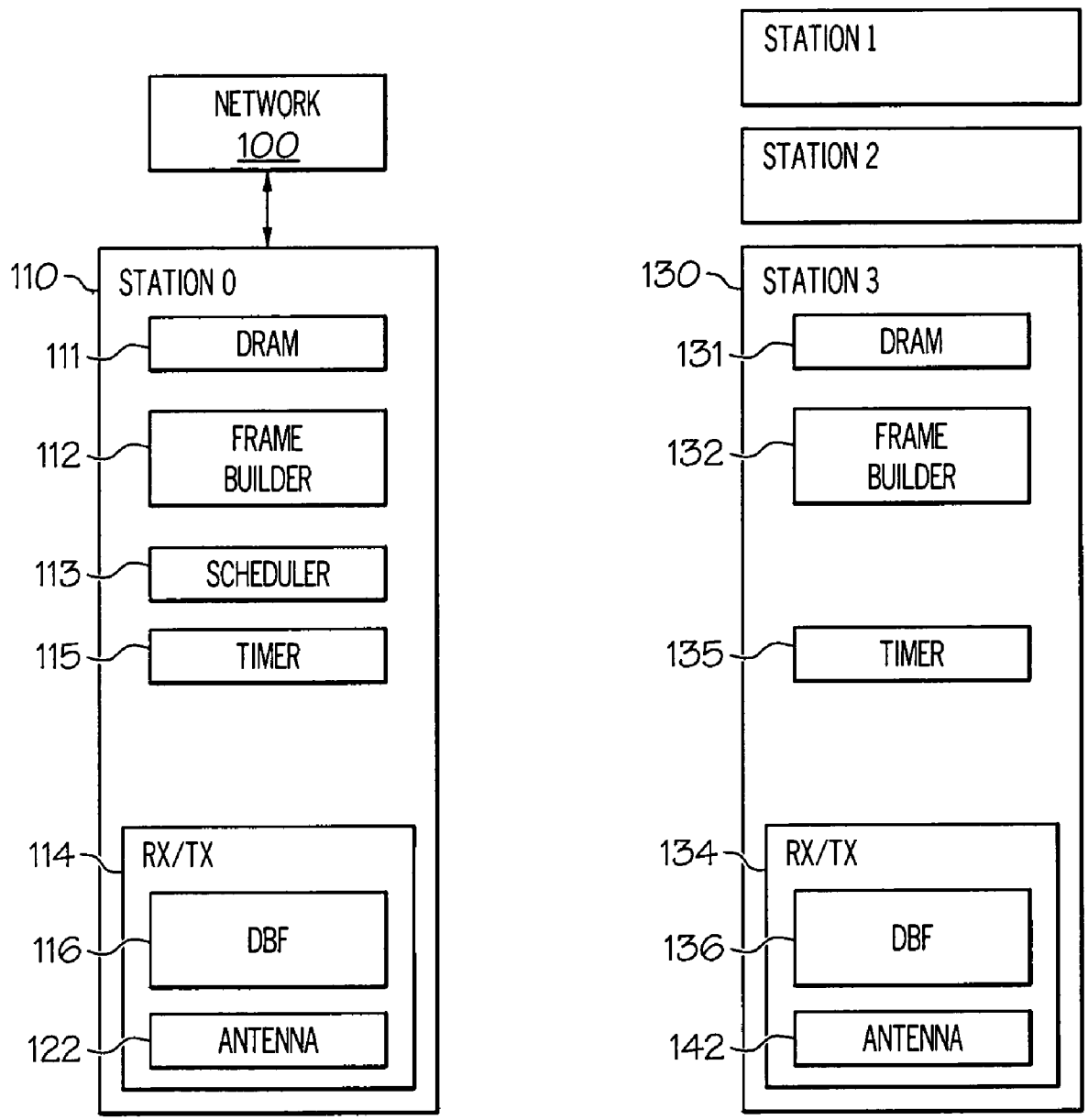
FIG. 1 depicts an embodiment of an example wireless network comprising a plurality of communications devices, including multiple fixed, portable, or mobile communications devices.

FIG. 1 shows an embodiment of an example wireless network. This configuration comprises a first communications device 110 that is wire line or wirelessly connected to a network 100 such as the Internet or a local intranet. Communication device 110 may communicate wirelessly with a plurality of communication devices 130. For ease of reference, the communications devices 110, 130 are labeled as stations 0, 1, 2, and 3. A station 130 may be a computer, laptop, notebook, cellular phone, PDA (Personal Digital Assistant), or other wireless-capable device. Thus, a communications device may be mobile, portable, or fixed. Communications device 110 and devices 130 each comprise a transceiver (RX/TX) 114, 134. Each transceiver comprises an RF (radio frequency) transmitter and an RF receiver. Each RF transmitter impresses digital data onto an RF frequency for transmission of the data by electromagnetic radiation. An RF receiver receives electromagnetic energy at an RF frequency and extracts the digital data there from. FIG. 1 may depict a Multiple-Input Multiple-Output (MIMO) system. Further, the devices 110 and 130 comprise Direct Random Access Memory (DRAM) for temporary storage of information.

The wireless communication system of FIG. 1 is intended to represent any of a wide variety of wireless systems which may include without limitation, NFC (Near Field Communications), WLAN (Wireless Local Area Network), WMAN (Wireless Metropolitan Area Network), WiMAX (Worldwide Interoperability for Microwave Access), 2.5-3G cellular, 3G RAN (Radio Access Network), 4G, RFID (Radio Frequency Identification), etc. In particular, in a WLAN, device 110 may represent the WLAN Access Point that controls a variety of different WLAN devices compatible with different parts of the Institute for Electrical and Electronics Engineers (IEEE) standard 802.11, including 802.11a, 802.11b, and 802.11g, as well 802.11n. Similarly, devices 130 may comply with different ones of these standards.

In one embodiment, communications device 110 comprises a Digital Beam Former (DBF) 116. DBF 116 transforms information signals into signals to be applied to elements of an antenna array 122. Antenna array 122 is an array of individual, separately excitable antenna elements. The signals applied to the elements of antenna array 122 cause it to radiate a plurality of substantially independent spatial channels. Each spatial channel so formed may carry information to one or more of communication devices 130. Similarly, a communication device 130 comprises a transceiver 132 to receive and transmit signals from and to device 110. Transceiver 132 may also comprise an antenna array 142 and a DBF 136. In parallel with Digital Beam Forming, transceiver 132 is capable of transmitting and receiving signals in accordance with IEEE standards 802.11a and 802.11g, i.e., non-digital-beam-forming devices.

Communication devices 110, 130 also comprise a frame builder to build data and control frames. In particular, frame builder 112 of device 110 creates a Power Save Multiple Poll (PSMP) frame which contains scheduling information for Down-Link Transmissions (DLT) and Up-Link Transmissions (ULT). During a DLT, information is transmitted from a controlling device 10 to a station 130. During an ULT, information is transmitted from a station 130, to the controlling device 110. Thus, frame builder 112 of device 110 builds PSMP frames and DLT frames, and frame builder 132 of device 130 builds ULT frames.

The PSMP frame tells a service-requesting station when to receive a DLT and when to send an ULT. Further, a station must know when the PSMP frame is transmitted so it can be prepared to receive it. Accordingly, controlling device 110 comprises a scheduler 113 to schedule the start of a service interval when a PSMP frame is transmitted and to communicate this Service Start Time (SST) to the receiving stations 130. Scheduler 113 also schedules the start of a DLT and its duration, and the start of a ULT and its duration for each station requesting service. Therefore, controlling device 110 also comprises a timer 115 to know when to transmit a PSMP frame, when to transmit a DLT, and when to receive an ULT according to scheduler 113. A station 130 also comprises a timer 135 which is synchronized with timer 115 of controlling device 110, so that it knows when to receive a PSMP frame, when to receive a DLT, and when to send an ULT.

Figure 1A:
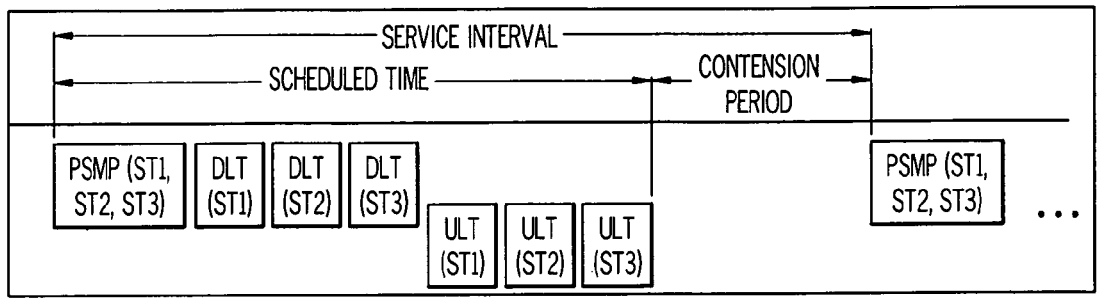
FIG. 1A depicts a diagram of timing of Down-Link Transmissions (DLT) and Up-Link Transmissions (ULT) between a controlling communication device and subordinate communication devices designated as stations 1, 2, and 3.

FIG. 1A shows a diagram of timing of Down-Link Transmissions (DLT) and Up-Link Transmissions (ULT) between a controlling communication device 110 and subordinate communication devices designated as stations 1, 2, and 3. In a WLAN system, the controlling communication device is an Access Point (AP) of the WLAN. At the beginning of a Service Interval (SI), stations 1, 2 and 3 awake to receive a Power Save Multiple Poll (PSMP) frame which specifies the timing of DLT and ULT for each of the three stations, using an addressing mechanism to distinguish between the stations.

Figure 1B:
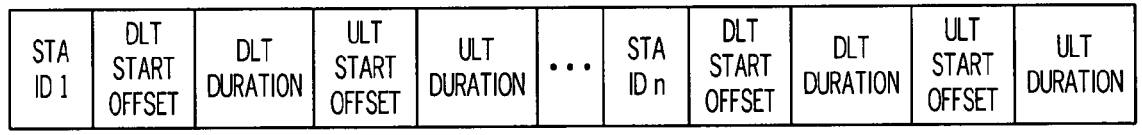
FIG. 1B depicts a format of a Power Saving Multiple Poll (PSMP) frame.

FIG. 1B shows the format of the PSMP frame. A first station is identified followed by the start offset time of that station's DLT, followed by the duration of the DLT. Then a field specifies the start offset time of that station's ULT, followed by the duration of the ULT. These fields are repeated for each station for which transmissions are scheduled during the service interval. During the service interval, all three stations receive the PSMP frame and therefore know when to receive their respective DLT and when to send their respective ULT. In the example of FIG. 1A, a DLT is sent to station 1, then a DLT is sent to station 2, and then a DLT is sent to station 3. Subsequently, the stations send their respective ULT sequentially. A station may sleep after the PSMP frame during a time when it is not scheduled to receive a DLT or send a ULT.

The PSMP frame is broadcast to all three stations simultaneously. In a digital beam forming system, each DLT may be sent on a substantially independent spatial channel, and each ULT may be received on a substantially independent spatial channel. In a non-digital-beam-forming system, a DLT may be broadcast in a fairly omni-directional mode. The receiving station knows from the PSMP frame whether the DLT occurring at a given time is intended for it, and will be awake during transmission of its DLT. Similarly, a receiving station will be awake for its ULT at its designated time. When a station is awake, its components, and in particular its transceiver, are fully powered by a battery power source of the station. When a station is asleep, only a timing system may be powered to enable a station to know when to wake up. Thus, to conserve power, a station can be asleep when no reception or transmission of data is scheduled and a PSMP frame is not being sent.

After the scheduled time for the PSMP, DLT, and ULT transmissions, but before transmission of the next PSMP, a contention period occurs. During the contention period, a communications establishment process may occur. This process enables the controlling communication device to transmit to a station a Start Service Time (SST) and a Service Interval (SI) that is a multiple of a Service Interval Granularity (SIG) period. Each station synchronizes its timing with the timing of the controlling communication device by way of a Time Synchronization Function, so that it knows when the SST (or when the SST plus an integer multiple of the SIG) occurs and will be awake at that time to receive the PSMP. This timing synchronization process also occurs during the contention period.

The communications establishment process also enables a station to transmit a Traffic Specification (TS) request to the controlling communication device during the contention period. A TS request is a request for a service interval to be scheduled for transmission of information between the controlling station and a subordinate station. In one embodiment, a TS request corresponds to whether an application program executing at the subordinate station requires transmission of voice, video conferencing, or data. For example, a voice service interval may be equal to one Service Interval Granularity (SIG) period; a video conferencing service interval may be equal to two SIG periods; and a data service interval may be equal to three SIG periods. Thus, a service interval requested by a station is an integer multiple of the SIG duration and the multiple depends on the type of information to be exchanged. Note that more than one SIG may be made available to support, for example, codecs (coder/decoder) with different sampling periods.

The methodology depicted in FIG. 1A may be used in wireless systems that include Wireless Local Area Networks (WLAN) and Wireless Metropolitan Area Networks (WMAN) that are compliant with Standards 802.11, promulgated by the Institute of Electrical and Electronics Engineers (IEEE 802.11). The standards encompass legacy systems that comply with the existing IEEE 802.11 standard, and existing supplemental standards such as 802.11a, 802.11b and 802.11g. In particular, the methodology of FIG. 1A may be employed in systems compliant with a standard currently under development, designated as IEEE 802.11n.

Figure 1C:
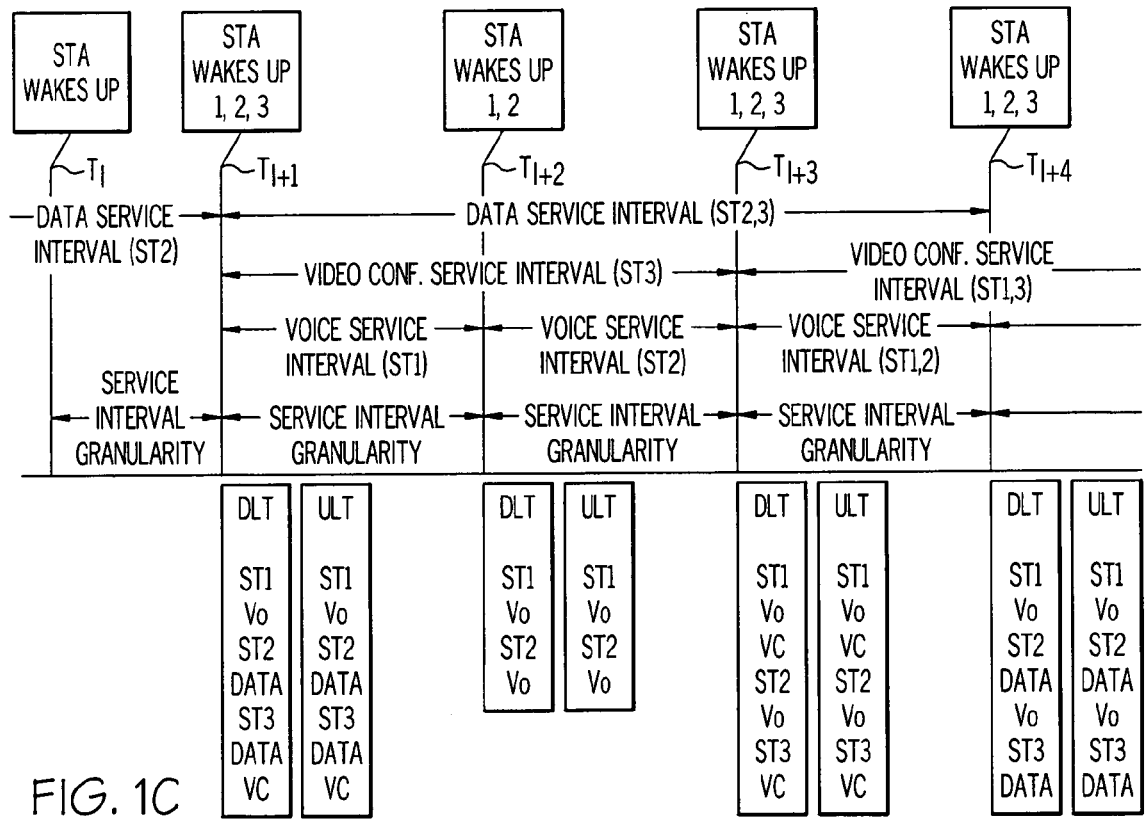
FIG. 1C depicts a timing diagram for scheduling of transmissions to and from three different stations for different service intervals corresponding to voice, video conferencing and data.

FIG. 1C shows a timing diagram for scheduling of transmissions to and from three different stations for different service intervals corresponding to voice, video conferencing and data. These three categories are exemplary and are not intended to limit the applications for which service intervals may be defined and established. In the example of FIG. 1C voice is assigned 1 SIG, video is assigned 2 SIG and data is assigned 3 SIG. The interval of time between time $T_i$ and $T_{i+1}$ is one SIG. At $T_i$, station 2 has been previously assigned a data service interval (3 SIG) which ends at $T_{i+1}$. During the contention period just prior to time $T_{i+1}$, station 1 establishes a voice service Traffic Specification (TS) request, station 2 establishes a data service TS request, and station 3 establishes both a video conferencing TS request and a data TS request. Accordingly, stations 1, 2, and 3, wake up at time $T_{i+1}$ to receive the PSMP frame which specifies when the DLT and ULT will occur for each station. Therefore, during the interval between $T_{i+1}$ and $T_{i+2}$, (one SIG period), a DLT and ULT will occur for voice for station 1. A DLT and ULT will occur for data for station 2. A DLT and ULT will occur for data for station 3. And, a DLT and ULT will occur for video conferencing for station 3.

During the contention period just before time $T_{i+2}$, station 2 establishes a voice service request and further receives a corresponding Service Start Time (SST) of $T_{i+2}$. Accordingly, stations 1 and 2 wake up at $T_{i+2}$ and receive a PSMP frame indicating the scheduling of DLT and ULT for voice for stations 1 and 2 between $Ti+_2$ and $T_{i+3}$. During the contention period just before time $T_{i+3}$, station 1 establishes a video conferencing request and receives a corresponding SST of $T_{i+3}$. Accordingly, station 1 wakes at $T_{i+3}$ to receive a PSMP frame scheduling a DLT and ULT for video conferencing for station 1. Stations 2 and 3 also awake at time $T_{i+3}$. Station 2 wakes up to receive scheduling of a DLT and ULT for voice. Station 3 wakes up to receive scheduling of a DLT and ULT for video conferencing. Similarly, at time $T_{i+4}$, station 1 awakes to receive scheduling of DLT/ULT for voice. Station 2 awakes to receive scheduling of DLT/ULT for data and for voice. Station 3 awakes to receive scheduling of DLT/ULT for data.

Thus, embodiments provide scheduling of service intervals that are integer multiples of a Service Interval Granularity (SIG) period. Note that voice service intervals are shorter (1 SIG) and therefore start more often, whereas data service intervals are longer (3 SIG) and therefore start less often. This results in a more efficient allocation of wake/sleep time among the stations and increases link utilization. Accordingly, scheduler 113 of controlling device 110 provides an SIG value and a SST during a contention period, such that a station receiving a requested service interval will awake at time T=SST and time T=SST+n*SIG, where n is an integer assigned to the type of application for which service is requested. Timer 115 determines when the SST and SST+n*SIG occurs. Timer 135 of a station 130 is synchronized with timer 115 during a contention period so that the station knows when the SST and SST+n*SIG occurs. At the beginning of a SST and at the beginning of SST+n*SIG, therefore, a station will wake up to receive a PSMP which tells the station when the DLT and ULT are scheduled for the requested service. When not receiving a DLT or PSMP or not transmitting a ULT, the station may sleep, thereby conserving power.

Accordingly, one embodiment comprises a control device for scheduling transmission of information in a wireless communication system. The control device comprises a receiver for receiving a traffic specification request from a requesting device. The traffic specification request specifies a type of information to be exchanged between the control device and the requesting device. For example, the type of information may be voice, video conferencing, general data, email, etc. The control device further comprises a scheduler to determine a service interval for the type of information to be exchanged. The service interval is a multiple of a service granularity period. The multiple depends on the type of information to be exchanged. The scheduler also schedules a service start time and a downlink transmission and an uplink transmission for the type of information to be exchanged. A frame builder constructs a frame comprising a start time and a duration for a downlink transmission and a start time and a duration for an uplink transmission. The start times and durations are received from the scheduler. A transmitter of the control device transmits the service start time and the service interval and the frame to the requesting device.

Figure 2:
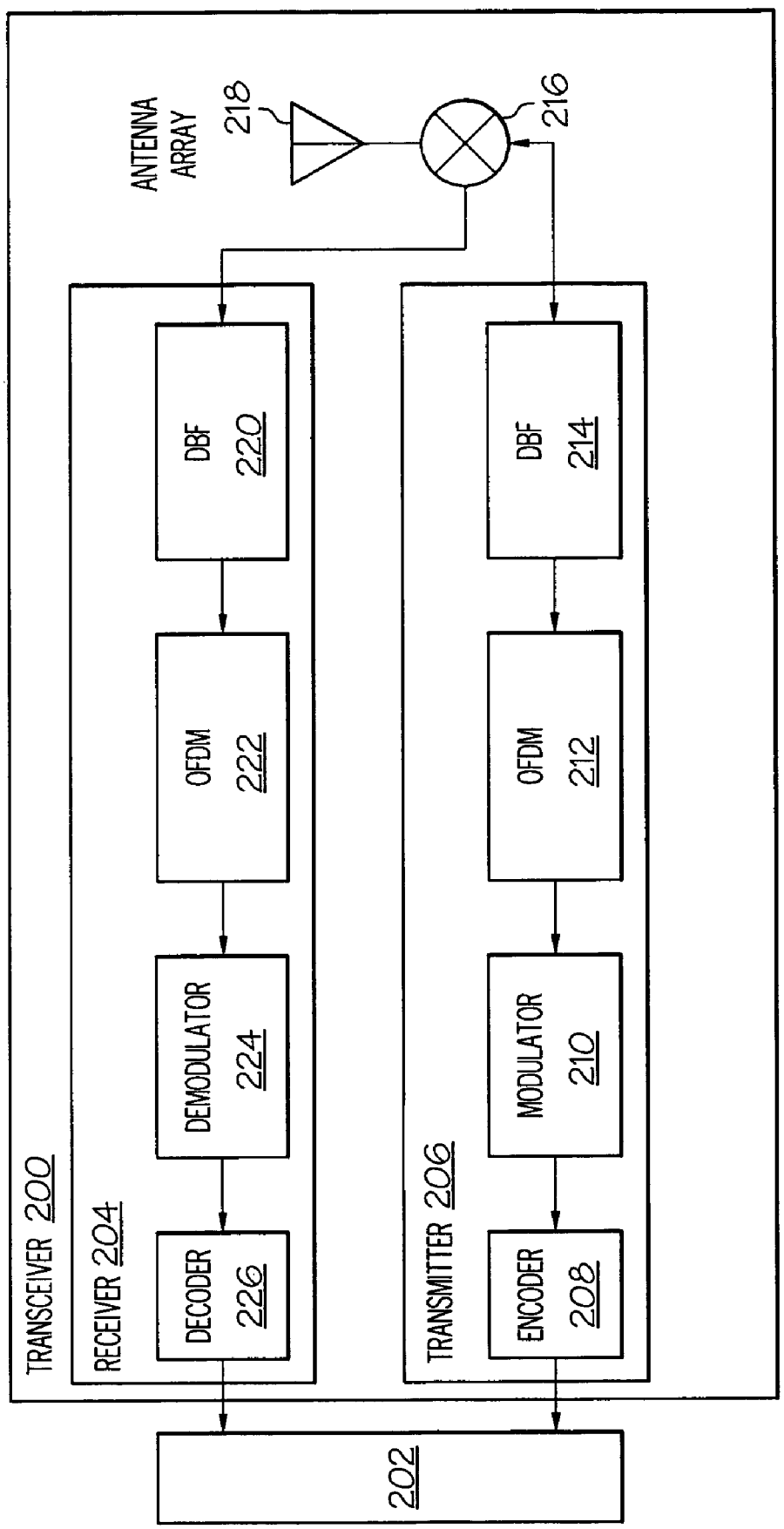
FIG. 2 depicts a general flow of example signal processing in a transceiver for Orthogonal Frequency Division Multiplexing (OFDM)-based broadband communication in a wireless network.

FIG. 2 shows a general flow of example signal processing in a transceiver 200. Transceiver 200 comprises a receiver 204 and a transmitter 206. Transmitter 206 may comprise one or more of an encoder 208, a modulator 210, an Orthogonal Frequency Division Multiplexer (OFDM) 212, and a Digital Beam Former (DBF) 214. Receiver 204 may comprise one or more of a DBF 220, an OFDM 222, a demodulator 224 and a decoder 226. Each of these components of transceiver 200 and their functions will now be described.

Encoder 208 of transmitter 206 receives data destined for transmission from a processor core 202. Processor core 202 may present data to transceiver 200 in blocks such as bytes of data. In particular, processor core 202 comprises a frame builder to construct and send to the transceiver PSMP frames and DLT and ULT. The timing of transmission of these frames is determined by a scheduler of processor core 202. Encoder 208 encodes the data using any one of a number of algorithms now known or to be developed. Coding may be performed to decrease the average number of bits that must be sent to transfer each symbol of information to be transmitted. Or coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security. One type of encoding is block encoding. Another type of encoding is linear convolutional encoding. Thus, different embodiments may implement different encoding algorithms.

Modulator 210 of transmitter 206 receives data from encoder 208. A purpose of modulator 210 is to transform each block of binary data received from encoder 208 into a unique continuous-time waveform that can be transmitted by an antenna upon up-conversion and amplification. Modulator 210 impresses the received data blocks onto a sinusoid of a selected frequency. More specifically, modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 is a band pass signal.

In one embodiment, modulator 210 maps a sequence of binary digits into a set of discrete amplitudes of a carrier frequency. This is called Pulse Amplitude Modulation (PAM). Quadrature Amplitude Modulation (QAM) is attained by impressing two separate k-bit symbols from the information sequence onto two quadrature frequencies, cos(2πft) and sin(2πft). In another embodiment, modulator 210 maps the blocks of data received from encoder 208 into a set of discrete phases of the carrier to produce a Phase-Shift Keyed (PSK) signal. An N-phase PSK signal is generated by mapping blocks of k=log$_2$ N binary digits of an input sequence into one of N corresponding phases θ=2π(n−1)/n for n a positive integer less than or equal to N. A resulting equivalent low pass signal may be represented as $$u(t) = \sum_{n=0}^{\infty} e^{j\theta_n} g(t - nT)$$

where g(t−nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 210 maps the blocks of data from an information sequence received from encoder 208 into a set of discrete frequency shifts to produce a Frequency-Shift-Keyed (FSK) signal. A resulting equivalent low pass signal may be represented as:

$$u(t) = \sum_{n=0}^{\infty} \exp(j\pi\Delta f t I_n) g(t - nT)$$

where $I_n$ is an odd integer up to N−1 and Δf is a unit of frequency shift. Thus, in an FSK signal, each symbol of an information sequence is mapped into one of N frequency shifts. Persons of skill in the art will recognize that the mathematical equations discussed herein are illustrative, and that different mathematical forms may be used to represent the pertinent signals. Also, other forms of modulation that may be implemented in modulator 210 are known in the art.

The output of modulator 210 may be up-converted to a higher carrying frequency. Or, modulation may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity, $$\sin A \cos B = \frac{1}{2}[\sin(A+B) + \sin(A-B)].$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

The output of modulator 210 is fed to an Orthogonal Frequency Division Multiplexer (OFDM) 212. OFDM 212 impresses the modulated data from modulator 210 onto a plurality of orthogonal sub-carriers. A serial bit stream is converted to blocks of n bits of data in parallel by a serial-to-parallel converter. Optionally, each bit is modulated in parallel by a modulator, instead of, or in addition to the modulation provided by modulator 210. Then, an inverse discrete Fourier transform (DFT), e.g. a Fast Fourier Transform (FFT), is performed on the data. This impresses the data onto multiple orthogonal sub-carriers. Then, the data may be converted to a serial stream of data of different channels by a parallel to serial converter.

Returning to FIG. 2, the output of OFDM 212 is fed to Digital Beam Former (DBF) 214. Digital beam forming techniques are employed to increase the efficiency and capacity of a wireless system. Generally, digital beam forming uses digital signal processing algorithms that operate on the signals received by, and transmitted from, an array of antenna elements to achieve enhanced system performance. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

FIG. 2 also shows diplexers 216 connected to antenna array 218. Thus, in this embodiment, a single antenna array is used for both transmission and reception. When transmitting, the signal passes through diplexers 216 and drives the antenna with the up-converted information-bearing signals. During transmission, the diplexers prevent the signals to be transmitted from entering receiver 204. When receiving, information bearing signals received by the antenna array pass through diplexers 216 to deliver the signal from the antenna array to receiver 204. The diplexer then prevents the received signals from entering transmitter 206. Thus, diplexers 216 operate as switches to alternately connect the antenna array elements to the receiver and the transmitter.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. Antennas 218 may be implemented using existing printed circuit board metallization technology. Microstrips, striplines, slotlines, and patches, for example, are all candidates for antennas 218.

FIG. 2 also shows an embodiment of a receiver 204 for receiving, demodulating, and decoding information bearing signals. The received signals are fed from antenna elements 218 to a Digital Beam Former (DBF) 220. DBF 220 transforms N antenna signals into L information signals, thereby determining information signals y from received signals x. The N received signals, x, are each fed to power dividers. The outputs of the power dividers are multiplexed among a set of combiners. Each input to a combiner is multiplied by a weight, $W^1_n$, each weight being an entry in a matrix U, for computation of y=Ux.

The output of DBF 220 is fed to Orthogonal Frequency Division Multiplexer (OFDM) 222. OFDM 222 extracts signal information from the plurality of subcarriers onto which information bearing signals are modulated. First, a sequential stream of data is converted to parallel. Then, a discrete Fourier transform (DFT) such as, e.g., a Fast Fourier Transform (FFT) is performed to extract the signal information from the sub-carriers. In one embodiment, demodulation is performed in parallel on the output data of the FFT. In another embodiment, demodulation is performed separately by a separate demodulator 224. Accordingly, in one embodiment, the OFDM processed signals are converted to a serial data stream and input to demodulator 224.

Demodulator 224 demodulates the received signal. Demodulation is the process of extracting information content from the received signal to produce an un-demodulated information signal. The method of demodulation depends on the method by which the information is modulated onto the received carrier signal. Thus, for example, if the modulation is PSK, demodulation involves phase detection to convert phase information to a binary sequence. Demodulation provides to a decoder a sequence of bits of information. Decoder 226 decodes the received binary data blocks from demodulator 224 and transmits the decoded information to processor core 202.

Persons of skill in the art will recognize that a transceiver will comprise numerous additional functions not shown in FIG. 2. Thus, a transceiver will comprise a Direct Random Access Memory (DRAM), a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing. Thus, FIG. 2 shows a general flow of signal processing in a transceiver. Actual implementations may vary. For example, not all embodiments may apply OFDM and not all embodiments may apply DBF.

Figure 3:
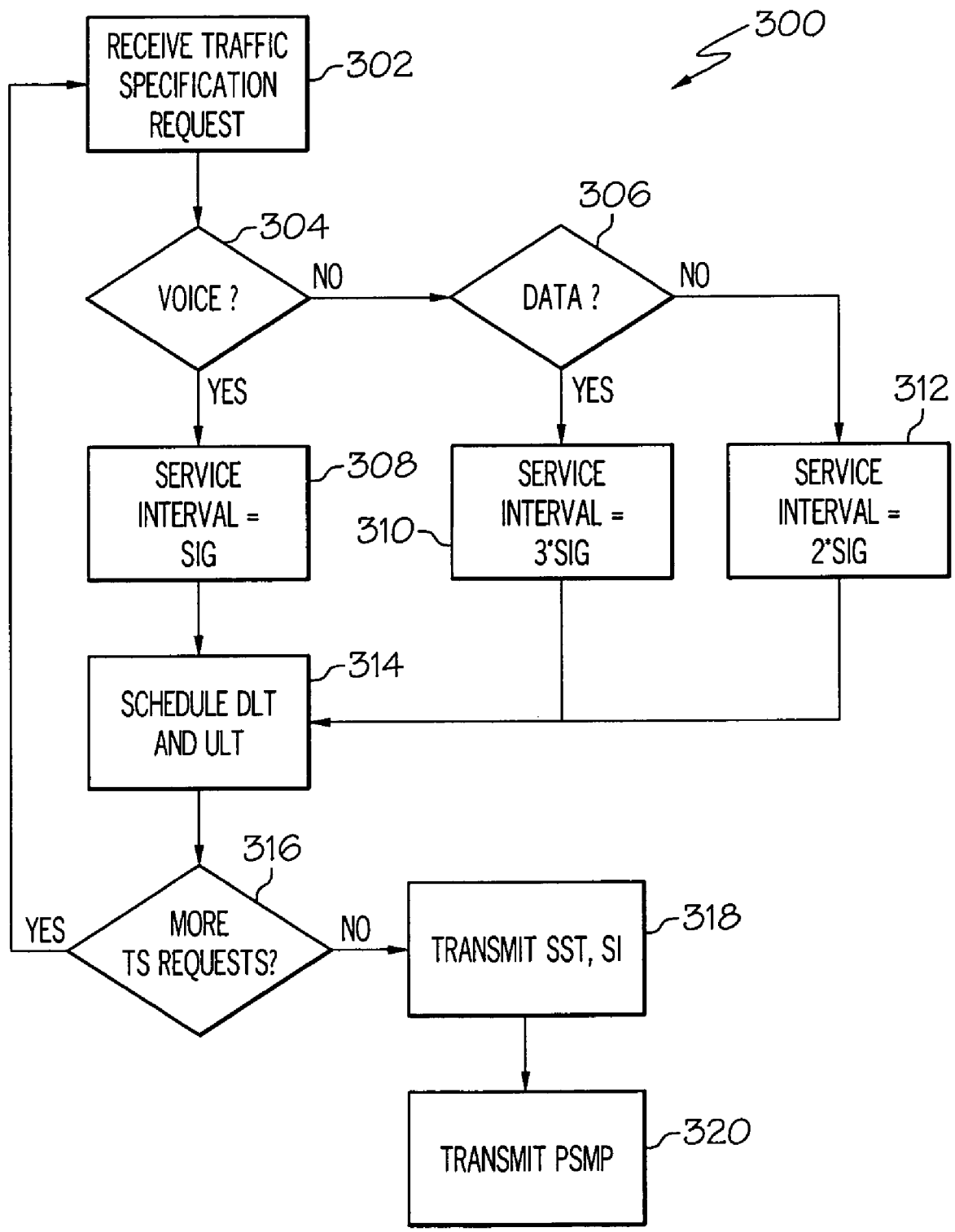
FIG. 3 depicts an example flowchart of an embodiment for determining and transmitting service intervals for different types of information.

FIG. 3 shows an example flowchart 300 of an embodiment for determining and transmitting service interval information for different types of information. During a contention period a controlling device receives a traffic specification request (element 302). The device determines whether the request is for voice service (element 304), for data service (element 306) or other type of information service. If voice, then the service interval (SI) is set to the Service Interval Granularity (SIG) period (element 308). If data, then the SI is set to 3*SIG (element 310). Otherwise, the SI is set to 2*SIG (element 312). The controlling device then schedules the time of transmission and the duration of the DLT and ULT for this request (element 314). The device also determines if there are any-more traffic specification (TS) requests (element 316) and, if so, repeats the process of service interval assignment. When TS request hase been received a scheduler of the controlling device transmits the Service Start Time (SST) and the Service Intervals (SI) for each requesting device (element 318). In addition, or in the alternative, occasionally, during contention periods, the Service Interval Granularity period is advertised to the subordinate devices. At the SST and at SST+SI, the controlling device transmits the PSMP frame (element 320) which contains the schedule of the DLT and ULT for each device to be served.

Thus, one embodiment is a method for scheduling transmission of information in a wireless network. The method comprises receiving by a controlling device one or more traffic specification requests from one or more requesting devices. A traffic specification request comprises an indication of a set of parameters related to the type of information to be exchanged between a requesting device and the controlling device. The method further comprises determining a service start time and determining a service interval for a traffic specification request. The service interval is an integer multiple of a service interval granularity period. The multiple depends upon the type of information indicated by the traffic specification request. The service start time and the service interval are transmitted to the corresponding requesting device so that the requesting device knows when to be awake and when it can sleep.

Some embodiments of the invention are implemented as a program product for use with an embedded processor such as processor core 202 of FIG. 2. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a non-transitory machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing by a machine, to cause the machine to perform a series of operations for scheduling transmissions of information in a wireless system. The operations comprise generating a service interval that is a multiple of a service interval granularity period. The multiple is determined from a type of information to be transmitted to a service requesting device. The operations further comprise scheduling a service start time and a downlink transmission for transmitting downlink information to the service requesting device during the service interval. The operations may further comprise scheduling an uplink transmission for receiving uplink information from the service requesting device during the service interval. In some embodiments, the operations may further comprise determining multiple service intervals for different types of information to be transmitted to the service requesting device. Downlink transmissions may be scheduled during each of a plurality of service intervals corresponding to each of a plurality of different types of information to be transmitted to the requesting device.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for scheduling transmission of information in a wireless network, the wireless network comprising a controlling device and a plurality of requesting devices, the method comprising:

advertising by the controlling device a service interval granularity period value;

receiving by the controlling device one or more traffic specification requests from one or more of the plurality of requesting devices, each traffic specification request comprising an indication of at least one type of information to be exchanged between a requesting device and the controlling device;

determining a service start time and determining service interval for one of the one or more traffic specification requests, the service interval being an integer multiple of the service interval granularity period, the multiple depending upon the at least one type of information indicated by the traffic specification request, the service interval comprising:
  a schedule time interval, the schedule time interval comprising times for:
    a scheduling frame;
    downloading for one or more of the plurality of requesting devices;
    uploading for one or more of the plurality of requesting devices; and
  a contention period for the plurality of requesting devices to transmit traffic specification requests;
  transmitting the service start time and the at least one service interval to the one or more requesting devices;
  downloading to at least one of the one or more requesting devices during a portion of the schedule time interval scheduled for downloading; and
  receiving uploading from another of the one or more requesting devices during a portion of the schedule time interval scheduled for uploading.

2. The method of claim 1, further comprising synchronizing a timer of at least one of the one or more requesting devices with a timer of the controlling device.

3. The method of claim 1, wherein one of the more than one types of information indicated by the one or more of the traffic specification requests comprises voice information.

4. The method of claim 3, wherein the service interval comprises a first service interval equal to one service interval granularity period.

5. The method of claim 3, wherein another of the more than one types of information indicated by the one or more of the traffic specification requests comprises video conferencing information.

6. The method of claim 5, further comprising determining a second service interval equal to two service interval granularity periods, the service interval and the second service interval to begin at the service start time.

7. The method of claim 1, further comprising:
  determining a service start time and another service interval for a traffic specification request, the service interval being an integer multiple of the service interval granularity period, the multiple depending upon the type of information indicated by the traffic specification request, the other service interval comprising:
    a schedule time interval, the schedule time interval comprising times for:
      a scheduling frame;
      downloading for one or more of the plurality of requesting devices; and
      uploading for one or more of the plurality of requesting devices; and
    a contention period for the plurality of requesting devices to transmit traffic specification requests;
  transmitting the service start time and the other service interval to the plurality of requesting devices;
  downloading to at least one of the one or more requesting devices during a portion of the other schedule time interval scheduled for downloading; and
  receiving uploading from another of the one or more requesting devices during a portion of the other schedule time interval scheduled for uploading, wherein the service interval and the other service interval overlap.

8. The method of claim 7, wherein the determining another service interval comprises determining another service interval to begin at the service start time of the service interval.

9. The method of claim 7, further comprising:
  receiving by one of the requesting devices according to a schedule of the scheduling frame of the service interval a download of one type of information; and
  receiving by the requesting device according to a schedule of the scheduling frame of the other service interval a download of another type of information.

10. A control device for scheduling transmission of information in a wireless communication system comprising a plurality of requesting devices, the control device comprising:
  a receiver for receiving at least one traffic specification request from at least one of the plurality of requesting device specifying at least one type of information;
  a scheduler to determine a service interval for the at least one type of information to be exchanged that is a multiple of the service interval granularity period and to schedule a service start time and a downlink transmission and an uplink transmission for the at least one type of information to be exchanged, and a contention period for the plurality of requesting devices to transmit traffic specification requests;
  a frame builder to construct a frame comprising a scheduling frame, downlink start time and a duration for the downlink transmission and an uplink start time and a duration for the uplink transmission, the start times and durations received from the scheduler; and
  a transmitter to transmit the service interval granularity period, the service start time and the at least one service interval and the frame from the control device to the plurality of requesting devices and to download to at least one of the one or more requesting devices during a portion of the schedule time interval scheduled for downloading; wherein the receiver is to receiving uploading from another of the one or more requesting devices during a portion of the schedule time interval scheduled for uploading.

11. The device of claim 10, wherein the scheduler is to determine the service interval to be equal to the service granularity period if the type of information is voice.

12. The device of claim 10, wherein the scheduler is to determine the service interval to be twice the service granularity period if the type of information is video-conferencing.

13. The device of claim 10, wherein scheduler is to determine the at least one service interval to be thrice the service granularity period if the type of information is other than voice or video-conferencing.

14. A system for scheduling transmission of information in a wireless communication network comprising a plurality of requesting devices, the system comprising:
  a receiver to receive at least one traffic specification request from at least one of the plurality of requesting devices specifying at least one type of information;
  a scheduler to generate scheduling information comprising at least one service interval that is a multiple of a service interval granularity period, the multiple depending on the type of information indicated by the at least one traffic specification request and to schedule a service start time and a downlink transmission and an uplink transmission for the at least one type of information to be exchanged, and a contention period for the plurality of requesting devices to transmit traffic specification requests;
  a frame builder to construct a frame comprising a scheduling frame, downlink start time and a duration for the downlink transmission and an uplink start time and a duration for the uplink transmission, the start times and durations received from the scheduler;

a transmitter to transmit scheduling information to the at least one requesting device; and Direct Random Access Memory (DRAM) connected to the scheduler to store scheduling information.

15. The system of claim 14, further comprising a timer to be synchronized with a timer of the at least one requesting device during a contention period.

16. The system of claim 14, further comprising within the transmitter a modulator for modulating information onto orthogonal sub-carriers.

17. The system of claim 14, further comprising within the receiver a demodulator for demodulating information modulated onto orthogonal sub-carriers.

18. The system of claim 14, further comprising within the transmitter a digital beam former for steering downlink information into a plurality of substantially independent spatial channels.

19. A non-transitory machine-accessible storage medium containing instructions for scheduling transmissions of information in a wireless system, which, when the instructions are executed by a machine, cause said machine to perform operations, comprising:

generating at least one service interval that is a multiple of a service interval granularity period, the multiple determined from more than one types of information to be transmitted to at least one service requesting device, the more than one types of information to comprise different service periods, wherein the more than one types of information having different service periods are serviced during at least a first service interval granularity period of the at least one service interval; and scheduling a service start time and a downlink transmission for transmitting downlink information to the service requesting device during the at least one service interval, and a contention period for the plurality of requesting devices to transmit traffic specification requests.

20. The machine-accessible medium of claim 19, wherein the operations further comprise determining multiple service intervals for different types of information to be transmitted to the service requesting device.

21. The machine-accessible medium of claim 7, wherein the operations further comprise scheduling downlink transmissions during each of a plurality of service intervals corresponding to each of a plurality of different types of information to be transmitted to the requesting device.

22. The machine-accessible medium of claim 19, wherein the operations further comprise generating a power save multiple poll frame comprising a start time and a duration of a downlink transmission.

23. The machine-accessible medium of claim 22, wherein the power save multiple poll frame further comprises a start time and duration of an uplink transmission.

* * * * *